United States Patent [19]

Sabel et al.

[11] 3,868,347

[45] Feb. 25, 1975

[54] PROCESS FOR THE PRODUCTION OF POLYVINYL CHLORIDE-COATED SILICATE-CONTAINING MATERIALS

[75] Inventors: Alex Sabel; Walter Popp, both of Burghausen, Germany

[73] Assignee: Wacker-Chemie GmbH, Munich, Germany

[22] Filed: Oct. 17, 1973

[21] Appl. No.: 407,177

[30] Foreign Application Priority Data

Oct. 17, 1972   Germany............................ 2250868

[52] U.S. Cl..... 260/42.15, 117/100 S, 117/126 AB, 117/126 GR, 117/126 GS, 260/42.53
[51] Int. Cl. ............................................. C08f 45/04
[58] Field of Search......... 260/41 AG, 42.15, 42.53; 117/100 S, 126 AB, 126 GR, 126 GS

[56] References Cited
UNITED STATES PATENTS

| | | | |
|---|---|---|---|
| 3,265,644 | 8/1966 | Herman et al. | 260/8 |
| 3,471,439 | 10/1969 | Bixler et al. | 260/41 |
| 3,519,593 | 7/1970 | Bolger et al. | 260/41 |
| 3,635,752 | 1/1972 | Baer | 117/100 S |
| 3,692,816 | 9/1972 | Faille et al. | 260/46.5 |

OTHER PUBLICATIONS

Modern Plastics Encyclopedia, 1967, Sept. 1966, Vol. 44, No. 1A, pages 416, 417 & 457.

Primary Examiner—James H. Derrington
Attorney, Agent, or Firm—Hammond & Littell

[57] ABSTRACT

A method for the production of a polyvinyl chloride-coated silicate-containing material consisting essentially of suspending a water-insoluble silicate-containing material in an aqueous solution containing a catalytic amount of a watersoluble persulfate by agitation, heating said suspension to a temperature of from 30°C to 80°C, introducing a monomer mixture of (1) vinyl chloride containing up to 30 percent of monomers copolymerizable with vinyl chloride having only carbon, hydrogen and oxygen atoms and (2) from 0.5 to 30 percent by weight of vinyl chlorosilane, at such a rate whereby the pressure is maintained below the saturation vapor pressure of vinyl chloride, for a time sufficient to effect polymerization and recovering said polyvinyl chloride-coated silicate-containing material. The coated material is fully compatible with polyvinyl chloride and is utilized as a reinforcement material for polyvinyl chloride shaped bodies.

7 Claims, No Drawings

3,868,347

PROCESS FOR THE PRODUCTION OF POLYVINYL CHLORIDE-COATED SILICATE-CONTAINING MATERIALS

THE PRIOR ART

It is known to incorporate fillers or fibers in thermoplastic materials in order thereby to improve the mechanical and thermal properties. It has been found that a particularly good effect can be obtained when the plastic adheres well to the surface of the filler or fiber material.

Of special interest in this connection are the waterinsoluble silicate-containing materials. This term is quite generally understood to include glass, silica and natural silicate minerals in finely divided, but preferably fibrous form. While glass fiber modification is widely used for thermosetting plastics, for example in the polyester section, this technique has not yet found acceptance in this degree in thermoplastic plastic fabrication. The reasons for this lie in the processing conditions specific for thermoplastics as well as in the insufficient preparation of the glass fibers to be incorporated. A glass fiber modification specific for each thermoplastic has proved necessary. For example, a glass fiber prepared according to DAS (German Published Application No. ) 1,301,083, where treatment with a monomeric styrene compound is claimed, is unsuitable for use in PVC fabrication because of its incompatibility. Also, a glass fiber impregnation with chromium complexes, known as "Volan Finish,"does not meet the requirements because of impairment of the thermostability of the polymer.

Comparatively favorable conditions are achieved by a "silane modification,"where the silicate-containing materials, in particular glass fibers, are wetted, usually by immersion, with vinyl trichlorosilane dissolved for example in organic solvents. Depending on the type and surface constitution of the glass, these impregnations show variable success in PVC fabrication. In part, inhomogeneities, i.e., areas with variable thickness of impregnation, are inevitable, causing widely scattering strength values on shaped bodies. Besides, immersion impregnations of organic solvents containing chlorosilanes involve great expense because of their highly corrosive properties.

OBJECTS OF THE INVENTION

It is the object of the present invention to apply on silicate-containing material a firmly adhering coating which permits incorporating these silicate-containing materials in thermoplastics, in particular PVC, achieving much improved mechanical values on the finished product as well as increased thermostability.

Another object of the present invention is the development of a method for the production of a polyvinyl chloride-coated silicate-containing material consisting essentially of suspending a water-insoluble silicate-containing material in an aqueous solution containing a catalytic amount of a water-soluble persulfate by agitation, heating said suspension to a temperature of from 30°C to 80°C, introducing a monomer mixture of (1) vinyl chloride containing up to 30 percent of monomers copolymerizable with vinyl chloride having only carbon, hydrogen and oxygen atoms and (2) from 0.5 percent to 30 percent by weight of vinyl chlorosilane, at such a rate whereby the pressure is maintained below the saturation vapor pressure of vinyl chloride, for a time sufficient to effect polymerization and recovering said polyvinyl chloride-coated silicate-containing material.

A further object is the obtaining of the above polyvinyl chloride-coated silicate-containing materials.

These and other objects of the present invention will become more apparent as the description thereof proceeds.

DESCRIPTION OF THE INVENTION

The invention concerns a method for the production of a polyvinyl chloride-coated silicate-containing material, characterized in that a mixture of vinyl chloride and 0.5 percent to 30 percent by weight, preferably 1 to 10 percent by weight, of vinyl chlorosilane is introduced into an aqueous suspension of the silicate-containing material and is polymerized in the presence of water-soluble persulfates at temperatures of 30°C to 80°C, while the pressure is maintained below the saturation vapor pressure of vinyl chloride. More particularly, the invention concerns a method for the production of a polyvinyl chloride-coated silicate-containing material consisting essentially of suspending a water-insoluble silicate-containing material in an aqueous solution containing a catalytic amount of a water-soluble persulfate by agitation, heating said suspension to a temperature of from 30°C to 80°C. introducing a monomer mixture of (1) vinyl chloride containing up to 30 percent of monomers copolymerizable with vinyl chloride having only carbon,, hydrogen and oxygen atoms and (2) from 0.5 to 30 percent by weight of vinyl chlorsilane, at such a rate whereby the pressure is maintained below the saturation vapor pressure of vinyl chloride for a time sufficient to effect polymerization and recovering said polyvinyl chloride-coated silicate-containing material.

It has been found, surprisingly, that by the polymerization of vinyl chloride with vinyl chlorosilane (or the hydrolysis products thereof) in aqueous phase with water-soluble catalysts, firmly adhering PVC coatings on silicate-containing material can be produced. This material thus impregnated can readily be incorporated in thermoplastics, and from it shaped bodies with excellent mechanical values can be produced. The thermostability of these shaped bodies is also improved.

The special advantage and the surprising part of the method according to the invention is that in the aqueous phase an impregnation of the silicate-containing material with water-decomposable vinyl chlorosilanes and vinyl chloride is possible, although nothing is specifically known about the kind and extent of the occurring hydrolysis of the vinyl chlorosilanes.

Examples of vinyl chlorosilanes are, in particular, mono-vinyl chlorosilanes, particularly aliphatic mono-vinyl chlorosilanes having from 2 to 8 carbon atoms and one silicon atom, as for example, vinyl trichlorosilane, vinyl methoxydichlorosilane, vinyl ethoxydichlorosilane, vinyl methyl-dichlorosilane, vinyl ethydichlorosilane, vinyl dimethoxychlorosilane, vinyl diethoxychlorosilane, vinyl dimethyl-chlorosilane and vinyl diethy-chlorosilane. Optionally also mixtures of the vinyl chlorosilanes may be used.

The method of the invention can be carried out with a variety of silicate-containing materials of a water-insoluble nature and of a particle size capable of being suspended in water by agitation. Examples are silica, asbestos, mica, and in particular glass. Glass can be used for example in the form of mats, fabrics, webs, skeins, bundles, beads, and in particular as glass fiber, generally a short fiber of a length of 0.3 to 3 mm being used. These mineral materials are suspended in water, it being necessary to provide for maintenance of the suspended state mostly by agitation. The particle size of the silicate-containing material therefore preferably should not be in excess of 5 mm in its largest dimension. The aqueous phase contains a water-soluble persulfate, mostly in quantities of 0.1 to 4 percent by weight, based on the aqueous phase. Portions of the persulfate may also be added during the polymerization. Examples of water-soluble persulfates are the alkali metal persulfates such as sodium persulfate and potassium persulfate, and ammonium persulfate.

In addition to the persulfate, water-soluble reducing agents may, in some cases, expediently be used. They are used mostly in amounts of 0.01 to 1 percent by weight. Examples of such reducing agents are alkali sulfites or Rongalite. The reducing agent may also be proportioned in during the polymerization, and likewise, if the reducing agent is charged first, the persulfate may be proportioned in continuously.

Additional polymerization assistants may optionally be contained in the aqueous phase, but they are not necessary.

The temperature of the aqueous phase is from 30°C to 80°C. The amount of water is not critical. It is generally selected so that a uniform suspension of the silicate-containing material is formed in the water on agitation. Thus, it depends on the particle size of the silicate-containing material and the amount of agitation. The pressure in the polymerization vessel must not reach the saturation vapor pressure of vinyl chloride, so that no liquid vinyl chloride phase will be present. If the saturation vapor pressure is exceded, inferior products are formed and often no coating at all is obtained. For these reasons the vinyl chloride in mixture with vinyl chlorosilane is introduced at a rate so that only the consumption by the polymerization is replaced. This is readily done by maintaining the pressure at a constant predetermined level during the polymerization.

Together with the vinyl chloride and the vinyl chlorosilane still other unsaturated monomers polymerizable with vinyl chloride can be introduced in quantities up to 30 percent by weight, based on the vinyl chloride, Examples of such monomers are vinyl esters, e.g., vinyl acetate and vinyl propionate, or olefins, e.g., ethylene or propylene. Preferably, these monomers are copolymerizable with vinyl chloride and have only carbon, hydrogen and optionally oxygen atoms.

As reaction vessels common jacket-cooled autoclaves provided with agitators may be used. They usually include means for the proportioning addition of vinyl chloride, as one must operate below the saturation vapor pressure and thus little vinyl chloride is present in the autoclave.

The quantity polymerized onto the silicate-containing material is advantageously not less than 1 percent by weight and not more than 50 percent by weight of the coated material. This is true in particular when the coated silicate-containing material serves as a mixing component in thermoplastic compositions. Advantageously, these are molding compositions consisting of from 70 to 95 percent by weight of thermoplastic, in particular PVC, and from 5 to 30 percent by weight of the coated silicate-containing material. They are produced by mixing the thermoplastic with the silicate-containing material coated according to the invention. If the material according to the inventinon is to be used as such for the production of shaped bodies, coatings of over 50 percent by weight are also desirable.

The coating thickness is controlled by the polymerization time. That is, with a longer polymerization time more PVC is polymerized onto the silicate-containing material. Preferably glass fibers are coated and these are processed with PVC to form powder mixtures or also granulations. From these molded compositions, for example, water-tight pipes, fittings, plates, construction parts for facade protection, and vessels can be produced. The property improvements achieved are in particular increased thermostability and improved mechanical properties.

The following examples are illustrative of the invention without being limitative or restrictive.

EXAMPLE 1

100 parts by weight of an unfinished glass fiber of a fiber length of 0.3 to 0.5 mm were suspended in an acidproof autoclave in 500 parts by weight of water while stirring. 2.0 parts by weight of ammonium persulfate were dissolved in the water phase. After evacuation, the suspension was heated to a reaction temperature of 60°C. From a supply vessel a mixture of vinyl chloride and vinyl trichlorosilane was then introduced in such a way that the autoclave pressure did not exceed 8 atm. The vinyl trichlorosilane content was 6 percent by weight, based on the monomer mixture with vinyl chloride, The polymerization which occurred could be followed by the monomer consumption. After three hours, a total of 55 parts by weight of the monomer mixture had been charged under the conditions referred to. The reaction mixture was then left, without monomer addition, at the reaction temperature for another 20 minutes while stirring. After cooling, relieving the pressure, filtering, washing and drying, 145 parts by weight of a glass fiber coated with 32 percent by weight of PVC were obtained.

For the production of a 4-mm pressboard, first 86 parts by weight of a bulk polymerized PVC composition having a K value of 57 were rolled together with 3 parts by weight of basic lead sulfate, 2 parts by weight of fatty acid/stearate (acid component $C_{16}$–$C_{18}$), 1 part by weight of fatty alcohol ($C_{16}$–$C_{18}$) and 0.3 parts by weight of calcium stearate for 7 minutes at 175°C to form a rough sheet. Then, 44 parts by weight of the glass fiber prepared according to the invention were added and rolling was continued for another 3 minutes at 175°C. After pressing at 175°C and 200 atm for 10 minutes, a pressboard of a thickness of 4 mm was produced from the rough sheet. The bending strength according to DIN No. 53,452 of this pressboard was 1130 kp cm$^2$: it remained unchanged after 16 hours storage in water at 50°C.

EXAMPLE 2

For purposes of comparison, the same glass fiber was subjected to the conditions according to Example 1, but without the addition of vinyl trichlorosilane in the monomer mixture. A total of 150 parts by weight of vinyl chloride were charged into a suspension of 100 parts by weight of glass fiber according to Example 1 in 500 parts by weight of water, in which 2 parts by weight of ammonium persulfate had been dissolved at 60°C while stirring within 2 hours in such a way that the reaction pressure is at no time higher than 8 atm. A glass fiber modified with PVC was thus obtained which, under the microscope, clearly indicatedd that no surface modification of the glass fiber had taken place. A pressboard produced according to Example 1 with a comparable ratio of PVC to glass fiber gave a bending strength according to DIN No. 53,452 of 850 kp cm², which after 16 hours of storage in water at 50°C was increased to 881 kp cm².

EXAMPLE 3

When the oil-soluble dicyclohexyl peroxydicarbonate was used as polymerization catalyst instead of the water-soluble ammonium persulfate under the conditions of Example 2, no glass fiber modification occurred here either, as was shown under the microscope.

EXAMPLE 4

In an acidproof mixer autoclave, 50 parts by weight of glass fiber bundles of a length of 3 mm were dispersed in 500 parts by weight of water. The water phase contained 1 part by weight of ammonium persulfate in solution. The speed of the agitator was selected so that the glass fiber did not settle or deposit. At 64°C a monomer mixture of vinyl chloride and 3 percent by weight of vinyl trichlorosilane was charged so that the autoclave pressure at no time exceeds 8 atm. After 2 hours, 30 parts by weight of monomer mixture were thus taken up. After another 15 minutes of polymerization without monomer addition, the autoclave was cooled, the pressure was relieved and the product was filtered, washed and dried. 78 parts by weight (28 parts by weight PVC) of a PVC-coated glass fiber, were obtained. If, after a reaction time of 2 hours, the polymerization was not yet stopped, but was continued for 3 hours, so that in all 50 parts by weight of monomer mixture were taken up, a correspondingly thicker PVC coating (42 parts by weight PVC) was obtained. a glass fiber thus modified could readily be compounded in the dry mixer with the desired quantity and type of PVC, without having to fear felting. Also the pourability of such dry mixtures was considerably improved in comparison with a mixture with glass fiber not modified according to the invention.

The bending strength according to DIN No. 53,452 of a pressboard containing in all 20 percent by weight of the glass fiber prepared according to the invention (the production of the pressboard was described in Example 1) is 1220 kp cm², after water storage for 16 hours at 50°C, 1210 kp cm². By comparison, the unreinforced PVC board has a bending strength of 967 kp cm², or 927 kp cm² after 16-hour water storage at 50°C.

EXAMPLE 5

In an acidproof mixer autoclave, 400 parts by weight of glass balls of a grain size of 75 to 150 micron (Type 2227 of Ballotini, Germany) were dispersed in 1,000 parts by weight of water. The water phase contained 4 parts by weight of ammonium persulfate in solution. At 60°C, while stirring, a monomer mixture of vinyl chloride and 6 percent by weight of vinyl trichlorosilane was charged so that the autoclave pressure did not exceed 8 atm. After 4 hours a total of 230 parts by weight of monomer mixture had been taken up. After another 30 minutes of post-polymerization, the autoclave was cooled, the pressure relieved and the product was filtered, washed and dried. The reaction product obtained were glass balls uniformly coated with a PVC layer containing 34 percent by weight of PVC.

The glass balls thus modified were particularly suitable as reinforcement and filler material in the thermoplastic processing of PVC, preferably from the powder form. Optionally a combination with glass fibers modified according to the invention is possible.

EXAMPLE 6

In an enamelled mixer autoclave, 10 parts by weight of ground asbestos fibers were mixed in 250 parts by weight of water containing 0.3 parts by weight of ammonium persulfate in solution (140 rpm). After evacuating at a reaction temperature of 60°C, a monomer mixture of vinyl chloride and 5 percent by weight of vinyl trichlorosilane was charged from a supply vessel in such a way that the autoclave pressure did not exceed 8 atm. After 7 hours a total of 10 parts by weight of monomer mixture had been charged. After another hour, the autoclave was cooled, the pressure was relieved and the product was filtered, washed and dried. A PVC-coated asbestos fiber (45 percent by weight of PVC) was obtained which is eminetly suitable as reinforcement material for PVC shaped bodies.

The preceding specific embodiments are illustrative of the practice of the invention. It is to be understood, however, that other expedients known to those skilled in the art, or disclosed herein, may be employed without departing from the spirit of the invention or the scope of the appended claims.

We claim:

1. A method for the production of a polyvinyl chloride-coated silicate-containing material consisting essentially of suspending a water-insoluble silicate-containing material in an aqueous solution containing a catalytic amount of a water-soluble persulfate, by agitation, heating said suspension to a temperature of from 30°C to 80°C, introducing a monomer mixture of (1) vinyl chloride containing up to 30 percent by weight based on said vinyl chloride of monomers copolymerizable with vinyl chloride having only carbon, hydrogen and oxygen atoms and (2) from 0.5 percent to 30 percent by weight of vinyl chlorosilane, based on the monomer mixture with vinyl chloride at such a rate whereby the pressure is maintained below the saturation vapor pressure of vinyl chloride for a time sufficient to effect polymerization and recovering said polyvinyl chloride-coated silicate-containing material.

2. The process of claim 1 wherein said monomer mixture contains from 1 to 10 percent by weight of said vinyl chlorosilane.

3. The process of claim 1 wherein said monomer mixture consists of vinyl chloride and vinyl trichlorosilane.

4. The process of claim 1 wherein the quantity of said monomer mixture polymerized onto said silicate-containing material is from 1 to 50 percent by weight of the coated material.

5. The process of claim 1 wherein said silicate-containing material is suspendable particles of glass.

6. The process of claim 5 wherein said suspendable particles of glass are glass fibers having a length of from 0.1 mm to 5 mm.

7. The process of claim 1 wherein said vinyl chlorosilane is an aliphatic mono-vinyl chlorisilane having from 2 to 8 carbon atoms and one silicon atom.

\* \* \* \* \*

UNITED STATES PATENT OFFICE
CERTIFICATE OF CORRECTION

Patent No. 3,868,347          Dated February 25, 1975

Inventor(s) Alex Sable, Walter Popp, Johann Bauer

It is certified that error appears in the above-identified patent and that said Letters Patent are hereby corrected as shown below:

In the Heading:

Item [75] should read -- [75] Inventors: Alex Sabel, Walter Popp and Johann Bauer, all of Burghausen, Germany --.

Column 2, line 58, "ethy-" should read -- ethyl- --.

Column 2, line 61, "diethy-" should read -- diethyl- --.

Column 4, line 3, "inventinon" should read -- invention --.

Column 5, line 4, "indicatedd" should read -- indicated --.

Column 6, line 24, "eminetly" should read -- eminently --.

Signed and Sealed this twenty-third Day of March 1976

[SEAL]

Attest:

RUTH C. MASON
Attesting Officer

C. MARSHALL DANN
Commissioner of Patents and Trademarks